(12) United States Patent
Bosen et al.

(10) Patent No.: US 10,421,376 B1
(45) Date of Patent: Sep. 24, 2019

(54) CONVERTIBLE SEAT BACK

(71) Applicant: Armorworks Holdings, Inc., Chandler, AZ (US)

(72) Inventors: David A. Bosen, Chandler, AZ (US); Jose G. Olivarez, Jr., Chandler, AZ (US)

(73) Assignee: Armorworks Holdings, Inc., Chandler, AZ (US)

( * ) Notice: Subject to any disclaimer, the term of this patent is extended or adjusted under 35 U.S.C. 154(b) by 103 days.

(21) Appl. No.: 15/726,240

(22) Filed: Oct. 5, 2017

(51) Int. Cl.
*A47C 7/36* (2006.01)
*B60N 2/24* (2006.01)
*B60R 5/00* (2006.01)

(52) U.S. Cl.
CPC ............... *B60N 2/24* (2013.01); *B60R 5/006* (2013.01); *B60N 2205/30* (2013.01)

(58) Field of Classification Search
CPC ........ B60N 2/24; B60N 2205/24; B60R 5/006
USPC .......................................... 297/188.05, 284.4
See application file for complete search history.

(56) References Cited

U.S. PATENT DOCUMENTS

| | | | | |
|---|---|---|---|---|
| 2,591,306 A * | 4/1952 | Sherman | ................. | A47C 7/425 297/118 |
| 4,832,400 A * | 5/1989 | Aoki | ..................... | B60N 2/5825 297/228.13 |
| 4,856,844 A * | 8/1989 | Isono | ..................... | B60N 2/914 297/284.6 |
| 5,171,064 A * | 12/1992 | Boussaroque | ........... | A47C 7/38 297/112 |
| 5,190,348 A * | 3/1993 | Colasanti | ............... | A47C 7/467 297/284.6 |
| 5,533,787 A * | 7/1996 | Xiang | ...................... | B60N 2/66 297/284.5 |
| 5,567,011 A * | 10/1996 | Sessini | .................. | B60N 2/0232 297/284.4 |
| 5,628,543 A * | 5/1997 | Filipovich | ............... | B60R 5/006 297/113 |
| 5,758,924 A * | 6/1998 | Vishey | ................... | A47C 7/467 297/284.4 |
| 6,079,773 A * | 6/2000 | Hassan | ..................... | B60N 2/90 297/188.13 |
| 6,109,686 A * | 8/2000 | Fox | ......................... | A47D 11/02 297/105 |
| 6,206,463 B1 * | 3/2001 | Whigham | ................. | A47C 4/52 297/129 |
| 6,443,523 B1 * | 9/2002 | Reitze | ..................... | B60R 7/043 297/188.03 |
| 6,688,686 B1 * | 2/2004 | McEvoy | .................. | A47C 7/46 264/46.4 |

(Continued)

*Primary Examiner* — Shin H Kim
(74) *Attorney, Agent, or Firm* — James L Farmer

(57) ABSTRACT

Methods and apparatus are provided for a vehicle seat with a convertible seat back. In one embodiment the seat back has a seat back cushion with left and right spaced apart side portions and a lower lumbar portion, with a center cushion disposed in a first position between the side portions and above the lumbar portion of the seat back cushion. The center cushion has a lower end attached to the seat back, a back side facing the seat back, and a front side facing away from the seat back. The center cushion is configured to be moveable from the first position to a second position in which the upper end is proximate a lower end of the seat back, and the front side is facing a front side of a lumbar portion of the seat back cushion.

18 Claims, 3 Drawing Sheets

(56) References Cited

U.S. PATENT DOCUMENTS

| | | | | |
|---|---|---|---|---|
| 6,779,845 B1* | 8/2004 | Lin | ............................ | A47C 7/38 |
| | | | | 297/112 |
| 7,413,249 B2* | 8/2008 | Leutert | ................. | B60N 2/3081 |
| | | | | 297/237 |
| 8,459,735 B2* | 6/2013 | van Zyl | ................... | B60R 5/006 |
| | | | | 297/188.04 |
| 8,567,846 B1* | 10/2013 | Stevens | ..................... | B60N 2/36 |
| | | | | 296/183.1 |
| 8,926,017 B2* | 1/2015 | Grove | ................... | A47C 3/0252 |
| | | | | 297/284.1 |
| 9,241,575 B2* | 1/2016 | Wang | ...................... | A47C 31/00 |
| 9,545,863 B2* | 1/2017 | Alfano | ................... | B60N 2/643 |
| 2005/0006935 A1* | 1/2005 | Chang | ...................... | A47C 7/38 |
| | | | | 297/284.4 |
| 2012/0292955 A1* | 11/2012 | van Zyl | ................... | B60R 5/006 |
| | | | | 297/188.04 |

\* cited by examiner

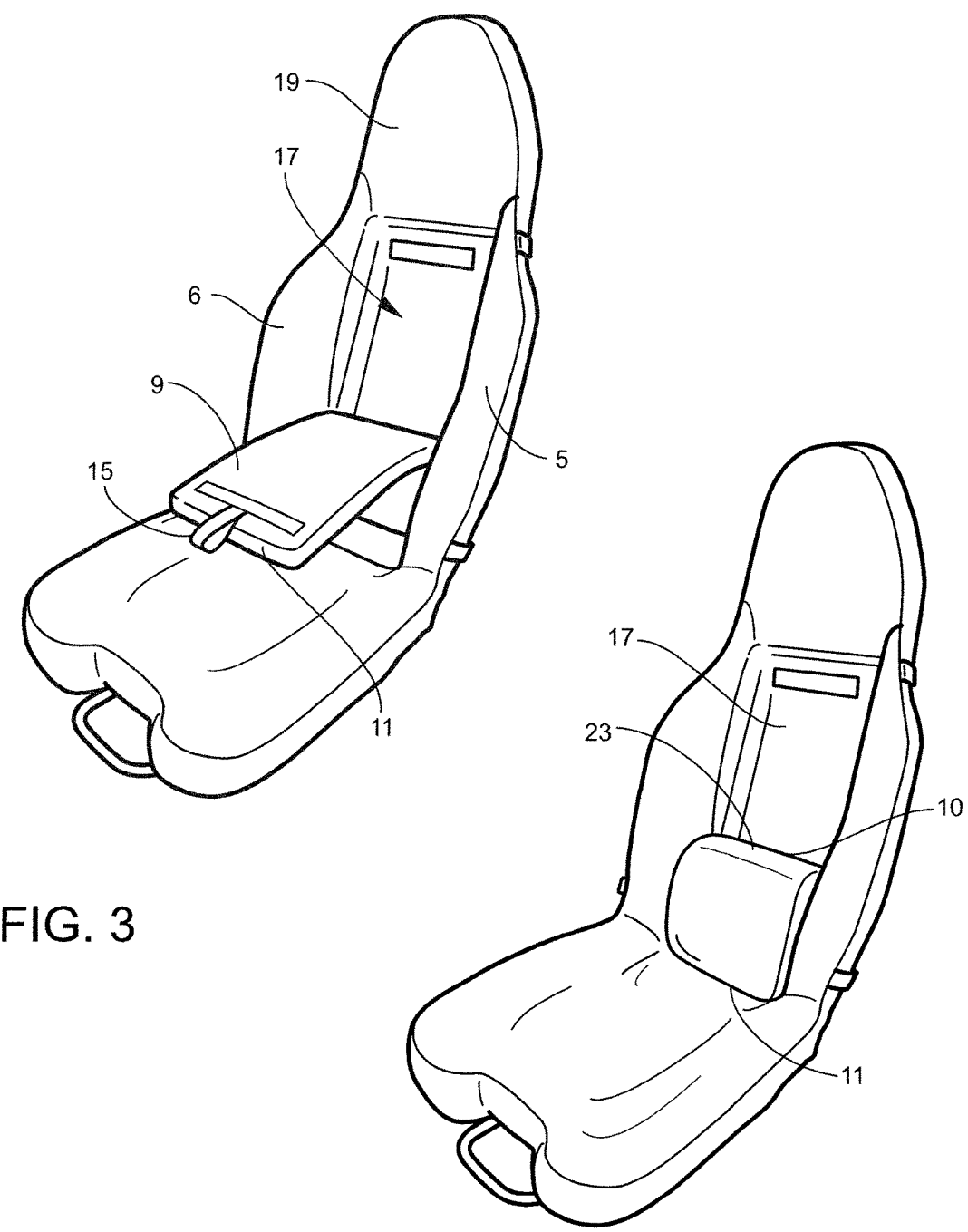

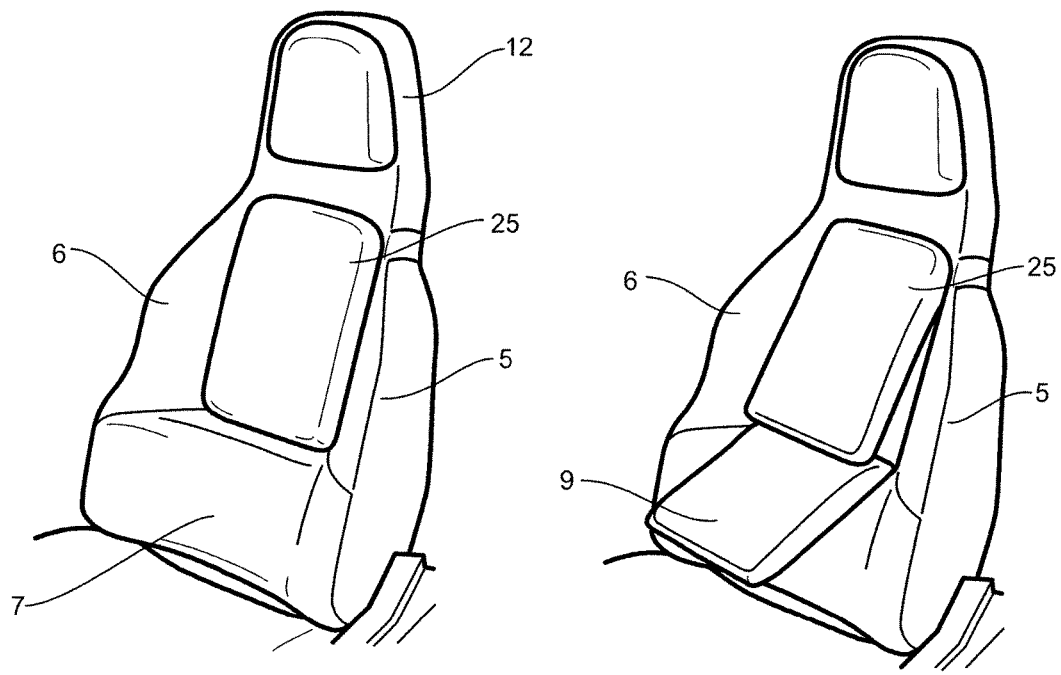
FIG. 5
FIG. 6
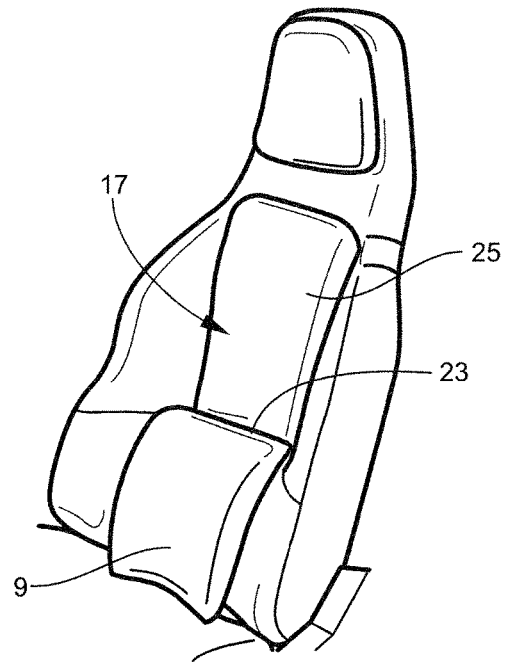
FIG. 7

CONVERTIBLE SEAT BACK

TECHNICAL FIELD AND BACKGROUND

The technical field of the present invention relates to vehicle seats, and may further relate to seats configured to accommodate backpacks and other equipment worn by a seated occupant.

BRIEF DESCRIPTION OF THE DRAWINGS

In the accompanying drawings:

FIG. 3 is a perspective view of the seat of FIG. 1 in which the seat back is at an intermediate stage of conversion from the standard configuration to a converted configuration suitable for a seated occupant wearing a backpack;

FIG. 4 is a perspective view of the seat of FIG. 1 in the converted configuration; and FIGS. 5 through 7 illustrate conversion from a standard to a converted configuration of a convertible seat back that utilizes a second center cushion that remains on the seat back when an underlying first center cushion is pulled out and repositioned.

DESCRIPTION OF THE EMBODIMENTS

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
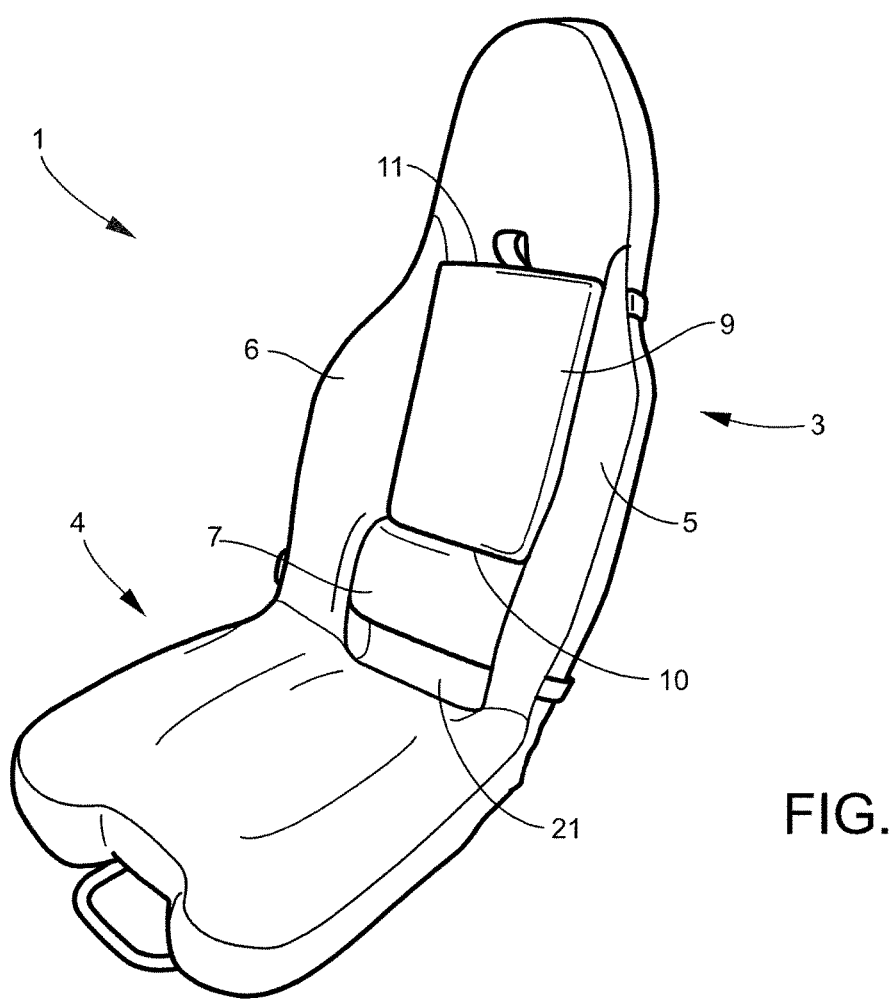
FIG. 1 is a perspective view of a vehicle seat incorporating an exemplary convertible seat back in a standard configuration suitable for a seated occupant not wearing a backpack.
Figure 2:
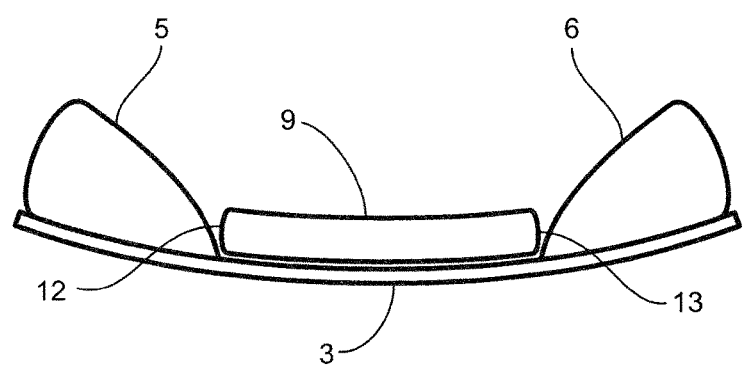
FIG. 2 is a cross section of the convertible seat back of FIG. 1 in the standard configuration.

An exemplary vehicle seat with a convertible seat back in accordance with the present disclosure is indicated generally at reference numeral 1 in the drawing Figures. Referring initially to FIGS. 1 and 2, the vehicle seat 1 is shown in a standard, or initial configuration, having a seat back 3 and a seat pan 4, with cushions substantially covering the front of the seat back and top of the seat pan. The seat back cushions include elongated left and right side cushions 5, 6, and a lumbar cushion 7 at a lower portion of the seat back. It should be appreciated that some or all cushions 5, 6, 7, can be separate pieces as implied above, or alternatively separate portions or regions of one single cushion on the seat back. In this initial configuration the seat back and cushions are configured to comfortably support the back of a seated occupant that is not wearing a backpack.

A moveable first center cushion 9, shown in a first position in FIG. 1, is disposed on the seat back above the lumbar cushion 7 and between the side cushions 5, 6. The first center cushion 9 may have a substantially rectangular shape as shown, with lower and upper ends 10, 11, and left and right sides 12, 13. In one embodiment the first center cushion is between about six and ten inches wide, and between about twelve and sixteen inches long; and in a more particular embodiment the first center cushion is about eight inches wide and about fourteen inches long.

The lower end 10 is attached to the seat back adjacent lumbar cushion 7, such as by stitching, or other permanent attachment means, while the upper end 11 may be secured to the seat back with a detachable fastener, such as with strips of hook and loop fastener material. The first center cushion is configured to thus be moveable by grasping and pulling the upper end away from the seat back with enough force to disengage any detachable fastener. A strap loop 15 or similar means may be provided at the upper end 11 for that purpose. Because the lower end of the cushion is attached to the seatback however, continuing to move the upper end away from the seat back will cause the cushion to pivot about its lower end, and swing down toward the seat pan 4.

FIGS. 3 and 4 illustrate movement of the first center cushion away from the first position of FIG. 1 to a second position shown in FIG. 4. FIG. 3 shows the center cushion 9 at an intermediate stage in which the center cushion 9 has been pulled away from the seat back and pivoted down to a roughly horizontal orientation, creating a recess 17 in the seat back. FIG. 4 shows the seat back in a converted configuration, with the first center cushion in a second, or stowed position, having been rotated about the fixed end down all the way down in front of the lumbar cushion 7. The center cushion may be wrapped around the lumbar cushion as shown, with the upper end 11 tucked underneath, and optionally connected to the seat back there with a detachable fastener, such as hook and loop strip 21, visible in FIG. 1 under the lumbar cushion. The front side of the first center cushion 9 (side facing out in FIG. 1) is now facing a front side of the lumbar cushion in this second position, with what was a back side of the center cushion now on the outside facing away from the seat. In this converted configuration the seat back and cushions are configured to comfortably support the back of a seated occupant wearing a backpack or hydration pack.

Recess 17 is bounded at the bottom and sides by the lumbar and side cushions 5, 6, 7, and at an upper end by a headrest portion 19 of the seat back cushion, as shown for example in FIG. 3. Alternatively the upper end may be bounded by the top of the seat back 3, if for example the seat back does not have a headrest portion, or the headrest is separate from or spaced away from the top of the seat back.

The recess 17 is configured to accept a pack worn on the back of a seated occupant such that the occupant is preferably not held away from the seat by the pack when the pack is inside the recess, or caused to lean forward. Accordingly the seat back and cushions may be configured to produce a recess with a width, length, and depth selected for that to occur. In one particular embodiment the dimensions are selected to accommodate a typical hydration pack on the back of a seated occupant, having a width of approximately six to ten inches, and a length (vertical) of approximately twelve to sixteen inches.

In addition to the above noted benefits of revealing the recess 17 and simultaneously stowing the first center cushion without having to completely detach it, moving the first center cushion to the stowed position provides other benefits. First, the act of wrapping the center cushion around the lumbar cushion has the effect of increasing the thickness of the lumbar pad by the added thickness of the first center cushion. Consequently, a seated occupant is moved further away from the seat back, thereby increasing the distance from the occupant's back to the seat back in the recess. The net result is effectively doubling the depth of the recess. For example, a four inch thick pack on the back of a seated occupant may be accommodated using a center cushion that is only two inches thick.

Second, wrapping the first center cushion 9 around the lumbar 7 in the manner of FIG. 4 creates an elevated platform 23 at the bottom of the recess. In one embodiment platform 23 is configured to be at or above the bottom of a typical backpack worn by an occupant, allowing for some or all of the weight of the backpack to be supported by the platform, and thus unloading the occupant by that amount while seated.

In addition to the first center cushion 9, the convertible seat back may also include a second center cushion 25. FIG. 5 illustrates a standard configuration in which the second center cushion 25 overlays and hides the first center cushion 9. The dimensions of the first and second cushions may be optimized to provide a comfortable back support in this configuration for an occupant not wearing a backpack. Like the first center cushion, the second center cushion 25 is also attached to the seat back 3, but at an upper end of the cushion, instead of at the lower end like the first center cushion.

FIGS. 6 and 7 illustrate the process of changing the seat back of FIG. 5 to a converted configuration for supporting an occupant wearing a backpack. The process is essentially the same as described above for the embodiment of FIGS. 1 through 4, however with the added step of temporarily lifting the second center cushion 25 away from the seat back in order to reach in and pull out the upper end of the first center cushion. FIG. 6 depicts an intermediate stage of the conversion process, where the first center cushion 9 has been pulled from under the second center cushion 25, and swung down toward the lumbar cushion 7, while the lower end of the second center cushion 25 is still pulled away somewhat from the seat back.

The end result of continuing to bring the first center cushion 9 down over the lumbar cushion 7 until in the second, or stowed position, and pushing the second center cushion 25 back down against the seat back is shown in the converted configuration of FIG. 7. Because the first center cushion has been removed, the second center cushion is now closer to seat back, again creating a recess 17 in the seat back compared to the seat back shape of FIG. 5.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed is:

1. A vehicle seat with a convertible seat back comprising:
    an elongated recess in a front side of the seat back, the recess bounded by left and right side cushions on side portions of the seat back, and by a lumbar cushion on a lower portion of the seat back;
    a first center cushion disposed in the recess at a first position with an upper end of the first center cushion at an upper end of the recess, a lower end attached to the seat back at a lower end of the recess adjacent the lumbar cushion, a back side facing the seat back, and a front side facing away from the seat back, wherein the first center cushion is configured to be moveable from the first position to a second position out of the recess in which the upper end of the first center cushion is proximate a lower end of the seat back, and the front side of the first center cushion is facing a front side of the lumbar cushion; and a second center cushion attached to the seat back at the upper end of the recess and configured to overlay the first center cushion when the first center cushion is in the first position.

2. The vehicle seat of claim 1, wherein when the first center cushion is in the second position, the recess is large enough to accept a backpack worn by a seated occupant without causing the occupant to lean forward.

3. The vehicle seat of claim 2, wherein the recess is configured to fit a typical hydration pack worn by a seated occupant.

4. The vehicle seat of claim 1, wherein the first center cushion wraps around and tucks under a bottom edge of the lumbar cushion in the second position.

5. The vehicle seat of claim 4, wherein the first center cushion presents a platform configured to carry the weight of a pack worn by a seated occupant when the first center cushion is in the second position.

6. The vehicle seat of claim 5, further comprising a component of hook and loop type fastening material under the lumbar cushion configured to secure the first center cushion in the second position.

7. The vehicle seat of claim 1, wherein the first center cushion is rectangular, and between about one and two inches thick.

8. The vehicle seat of claim 7, wherein the first center cushion is between about six and ten inches wide, and between about twelve and sixteen inches long.

9. A vehicle seat with a convertible seat back comprising:
a seat back cushion with left and right spaced apart side portions and a lower lumbar portion; and
a first center cushion disposed in a first position between the side portions and above the lumbar portion of the seat back cushion, the first center cushion having a lower end attached to the seat back, a back side facing the seat back, and a front side facing away from the seat back, wherein the first center cushion is configured to be moveable from the first position to a second position in which the upper end is proximate a lower end of the seat back, and the front side is facing a front side of the lumbar portion of the seat back cushion, wherein the first center cushion wraps around and tucks under the lumbar portion of the seat back cushion when in the second position.

10. The vehicle seat of claim 9, further comprising a second center cushion attached to the seat back at an upper end of the cushion, configured to overlay the first center cushion when the first center cushion is in the first position.

11. The vehicle seat of claim 9, wherein moving the first center cushion from the first position to the second position creates a recess in the seat back.

12. The vehicle seat of claim 9, wherein the first center cushion presents a platform configured to carry the weight of a pack worn on the back of a seated occupant when the first center cushion is in the second position.

13. The vehicle seat of claim 9, further comprising a component of hook and loop type fastening material under the seat back cushion configured to secure the first center cushion in the second position.

14. The vehicle seat of claim 9, wherein the first center cushion is rectangular, and between about one and two inches thick.

15. The vehicle seat of claim 14, wherein the first center cushion is between about six and ten inches wide, and between about twelve and sixteen inches long.

16. A method of converting a vehicle seat back from a standard configuration with cushions substantially covering the seat back to a converted configuration with a central recess in the seat back configured to receive and support a pack worn on the back of a seated occupant, the method comprising the steps of:
grasping and pulling a center cushion away from the seat back to thereby create the recess;
pivoting the center cushion about a lower end thereof that is attached to the seat back until the center cushion overlays a lumbar cushion proximate a lower portion of the seat back; and
securing the center cushion in place overlaying the lumbar cushion.

17. The method of claim 16, wherein the step of securing the center cushion in place comprises securing an upper end of the center cushion under the lumbar cushion with hook and loop fastening material.

18. The method of claim 17, wherein the center cushion presents a platform configured to support a pack worn on the back of a seated occupant when seat back is in the converted configuration with the center cushion overlaying the lumbar cushion.

* * * * *